United States Patent [19]
Willis

[11] Patent Number: 5,519,454
[45] Date of Patent: May 21, 1996

[54] LUMA/CHROMA SEPARATION FILTER WITH COMMON DELAY ELEMENT FOR COMB FILTER SEPARATION AND RECURSIVE NOISE REDUCTION OF COMPOSITE VIDEO INPUT SIGNAL

[75] Inventor: Donald H. Willis, Indianapolis, Ind.

[73] Assignee: Thomson Consumer Electronics, Inc., Indianapolis, Ind.

[21] Appl. No.: 423,710

[22] Filed: Apr. 21, 1995

[51] Int. Cl.⁶ .................................................. H04N 9/78
[52] U.S. Cl. .................... 348/663; 348/665; 348/624; 348/908
[58] Field of Search .................... 348/607, 609, 348/610, 620, 624, 621, 663, 665, 666, 667, 668, 669, 670, 908; 358/31, 36; H04N 9/78

[56] References Cited

U.S. PATENT DOCUMENTS

| 4,246,610 | 1/1981 | Takahashi | 358/167 |
| 4,571,613 | 2/1986 | Fukuda | 348/665 |
| 4,786,963 | 11/1988 | McNeely et al. | 358/31 |

Primary Examiner—Safet Metjahic
Assistant Examiner—Sherrie Hsia
Attorney, Agent, or Firm—Joseph S. Tripoli; Peter M. Emanuel; Richard G. Coalter

[57] ABSTRACT

A composite video input signal is combined with a noise reduction signal to form a noise reduced first video signal which is delayed by multiple time periods of (i) one line less one-half color cycle, (ii) one line and (iii) one line plus one-half color cycle to form respective ones of first, second and third time delayed signals. The first and third delayed signals are combined to form an averaged signal from which a subtractor subtracts the composite video input signal. The resultant difference signal is limited to form the noise reduction signal. The noise reduced first video signal and the second delayed video signal are combined in an output circuit to provide noise reduced and separated chrominance and luminance output signals.

20 Claims, 7 Drawing Sheets

LUMA/CHROMA SEPARATION FILTER WITH COMMON DELAY ELEMENT FOR COMB FILTER SEPARATION AND RECURSIVE NOISE REDUCTION OF COMPOSITE VIDEO INPUT SIGNAL

FIELD OF THE INVENTION

This invention relates generally to circuits for separating the luminance and chrominance components of composite video signals and particularly to signal separation circuits of the type employing comb filters.

BACKGROUND OF THE INVENTION

In video apparatus, such as television receivers or monitors, video cassette recorders, video disc recorder/player units and the like, the need frequently arises for separating a composite video signal into individual luminance and chrominance components. A simple way of providing such separation is to low-pass filter the composite signal to obtain a luminance component and to high-pass or band-pass filter the composite signal to obtain the chrominance component. This technique, however, does not efficiently recover the components and results in a loss of sharpness in displayed images. Since composite components are spectrally interleaved, comb filtering provides a more efficient separation and so a clearer displayed picture.

The advantages of comb filter separation of the luminance (Y) and chrominance (C) components of a composite video signal are well known. In the most elementary "one-line" or "1-H" form of comb filter, picture elements ("pixels" hereafter) temporally spaced a line apart are added to produce a separated luminance component and subtracted to produce a separated chrominance component. Such filters provide superior image detail as compared, for example, with the low-pass/high-pass filter method of Y/C separation but may tend to exhibit visual artifacts (e.g., hanging dots) for certain image features.

Some two-line (2-H) comb filters provide enhanced performance over the 1-H comb described above by "adapting" the filter to the image detail and so achieve a desirable reduction in visual artifacts. In principle, this is done by combing the composite signal twice in the vertical direction to produce two combed chrominance signals and then selecting or "blending" them with a "soft-switch" based on an analysis of image characteristics to thereby select the signal (or "blend" of signals) having the least visual artifacts. The chrominance signal so produced is then subtracted from the composite signal to provide a separated luminance output signal. This form of chrominance/luminance signal separation is commonly known as "2-H" or two-line combing and provides reduced visual artifacts as compared with 1-H combing and improved image detail as compared with the simple low-pass/high-pass filtering method of Y/C separation. A 2-H comb filter Y/C separation circuit is described, for example, by McNeely and Willis in U.S. Pat. No. 4,786,963 entitled ADAPTIVE Y/C SEPARATION APPARATUS FOR TV SIGNALS which issued 22 Nov. 1988.

SUMMARY OF THE INVENTION

The present invention is directed to meeting the need for noise reduction in television apparatus employing line comb filters for luminance/chrominance signal separation.

A method, in accordance with the invention, for noise reducing and separating components of a composite video input signal, comprises combining the composite video input signal with a noise reduction signal to form a noise reduced first video signal; delaying the noise reduced first video signal to form a plurality of delayed video signals having respectively different delays; forming the noise reduction signal by combining said composite video input signal with a selected pair of said delayed video signals; and combining the noise reduced first video signal with a further one of the delayed video signals to form separated and noise reduced chrominance and luminance output signals.

Apparatus, in accordance with the invention, for noise reducing and separating luminance and chrominance components of a composite video input signal, comprises a source for providing the composite video input signal and a first circuit means, coupled to the source, for combining the composite video input signal with a noise reduction signal supplied thereto to form a noise reduced first video signal. A second circuit means, coupled to the first circuit means, delays the noise reduced first video signal to form a plurality of delayed video signals having respectively different delays. A third circuit means, coupled to the source and to the second circuit means, combines the composite video input signal with a selected pair of the delayed video signals to form the noise reduction signal for the first circuit means. A fourth circuit means, coupled to the first and third circuit means, combines the noise reduced first video signal with a further one of the delayed video signals to form separated and noise reduced chrominance and luminance output signals.

BRIEF DESCRIPTION OF THE DRAWING

The foregoing and further features of the invention are illustrated in the accompanying drawing, wherein like elements are denoted by like reference designators, and wherein.

DETAILED DESCRIPTION

The luma/chroma separation filters of the present invention are of general utility and may be used in any NTSC standard video signal processing application requiring separation of a composite video signal into its component luminance and chrominance components and in which noise reduction is desired.

Advantageously, as explained below, the separator of the present invention reduces noise in both the chrominance and the luminance components of the separated signals. Moreover, the noise reduction provided includes a two-dimensional spatial effect. Specifically, the principal noise reduction is provided in the vertical direction for both luminance and chrominance components and is provided by an IIR (infinite impulse response) or "recursive" filter. Additional noise reduction in the horizontal direction is provided by an FIR (finite impulse response) comb filter that is "nested", so-to-speak, within a feedback loop of the IIR filter.

A further advantage of the overall filter is that there is a desirable sharing of delay elements for the noise reduction and separation functions. In fact, the sharing of elements is so efficient that the benefits of two-dimensional noise reduction are achieved with substantially the same amount of memory that would otherwise be required to provide only the signal separation function without any noise reduction at all.

An important technical advantage of combining the noise reduction and separation functions, in accordance with the invention, is that a synergistic effect is received wherein reliability is improved. This improvement is due to a reduction in parts count as compared, for example, with merely cascading separate noise reduction and separation filters.

Figure 1:
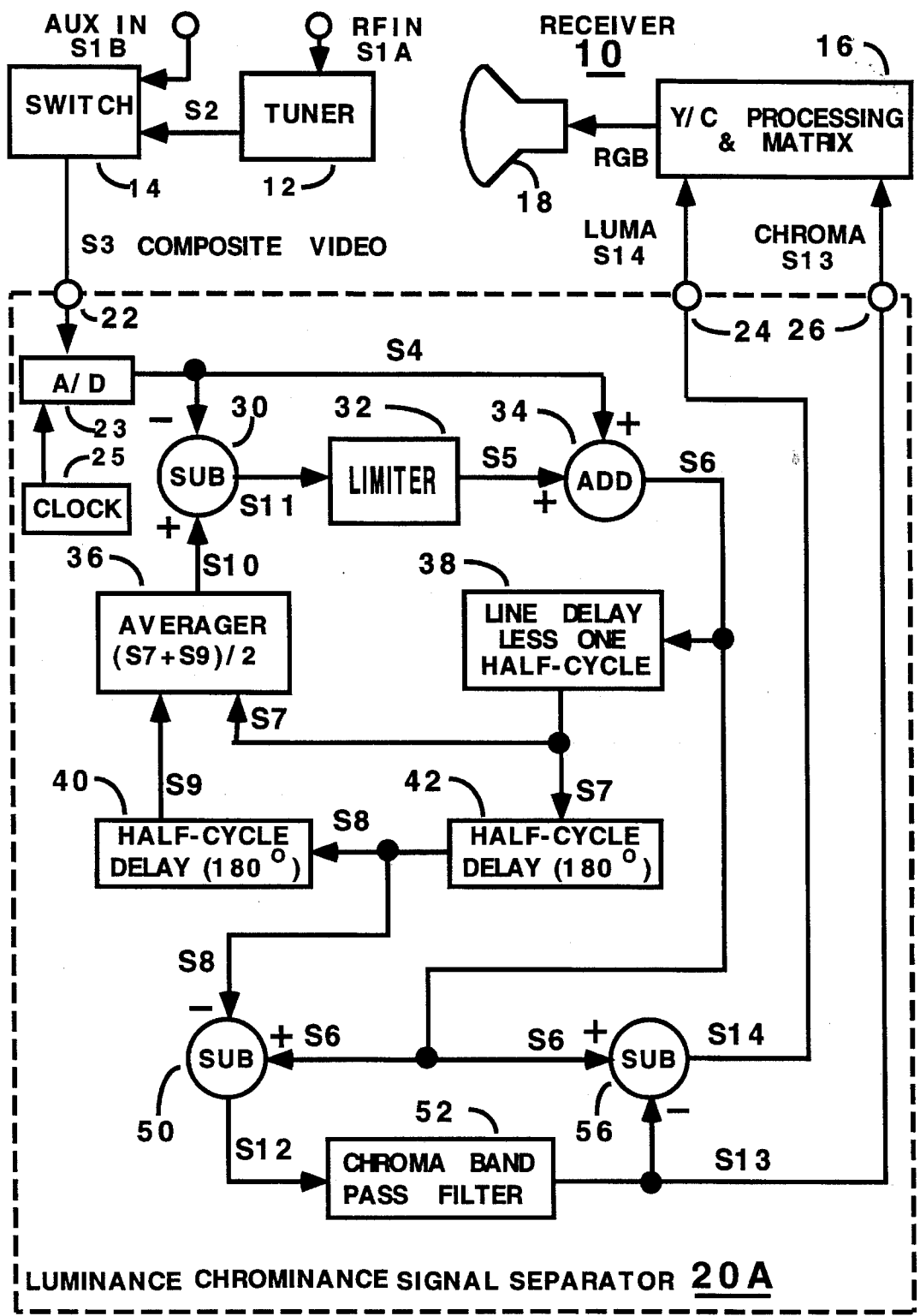
FIG. 1 is a block diagram of a television receiver including a luminance/chrominance signal separator embodying the invention.
Figure 2:
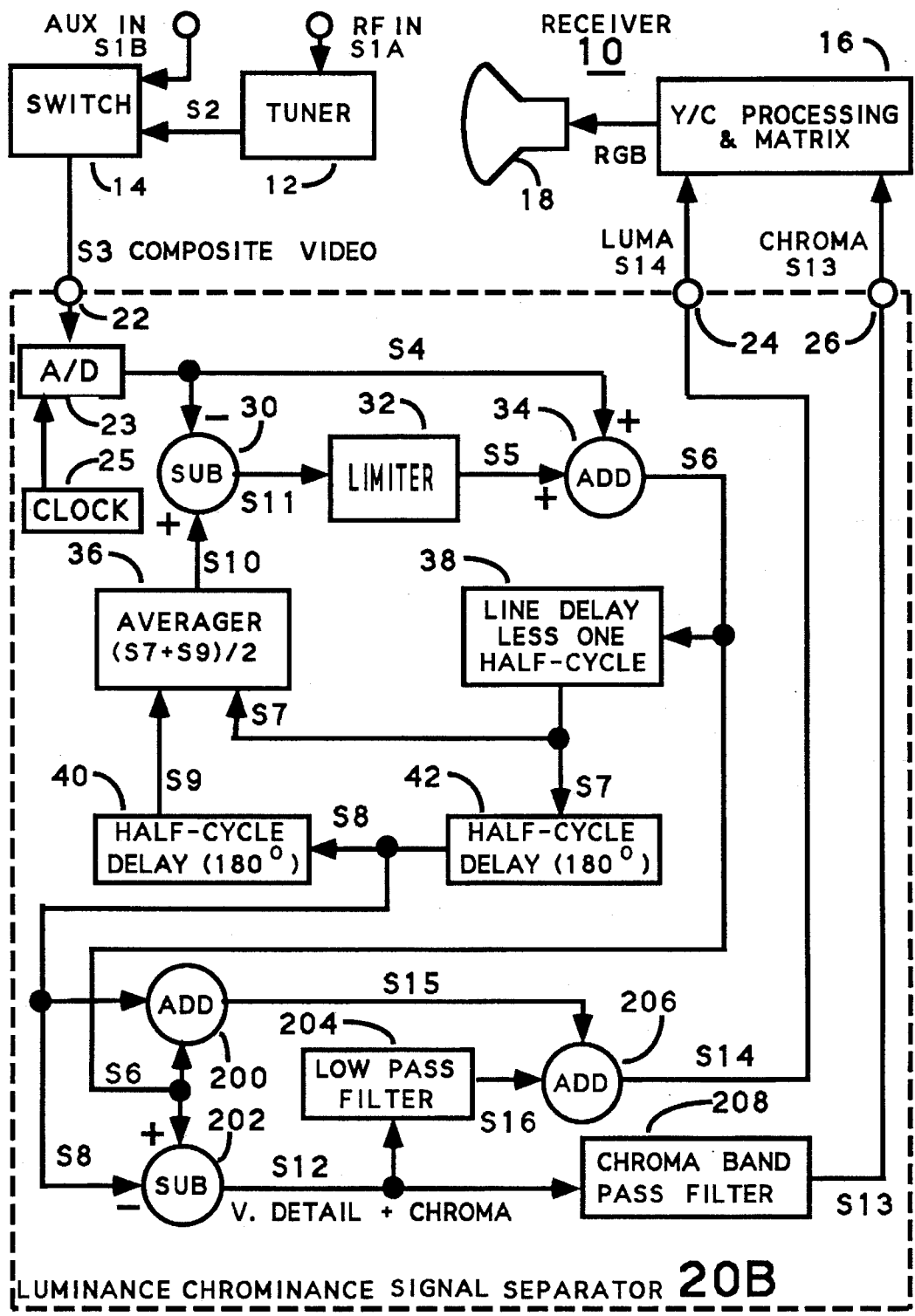
FIG. 2 is a block diagram illustrating a modification of the receiver of FIG. 1.
Figure 3:
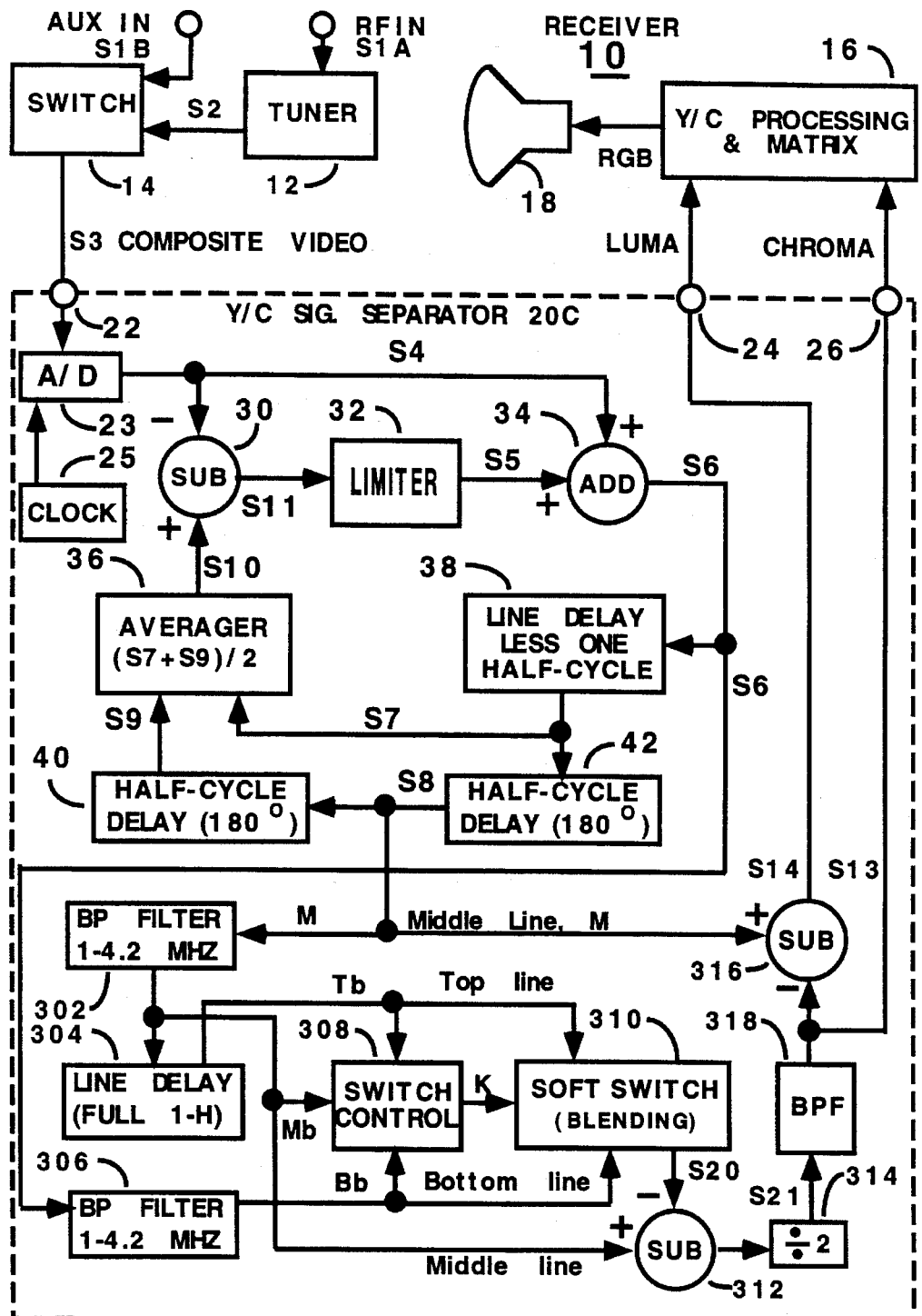
FIG. 3 is a block diagram illustrating another modification of the receiver of FIG. 1.

In the examples of the invention which follow, those of FIGS. 1 and 2 illustrate two different examples of the invention employing a principal delay of one horizontal line C1-H" hereafter). The example of FIG. 3 is more complex, requiring a principal net delay of about two horizontal lines C2-H" hereafter) in an "adaptive" comb filter configuration which desirably suppresses certain artifacts characteristic of conventional 1-H comb signal separators (e.g., "hanging dots") which may occur under certain picture conditions.

The television receiver 10 of FIG. 1 comprises a tuner unit 12 for tuning an RF input signal S1A and providing a baseband composite video output signal S2. A switch 14 is provided for selecting the baseband composite video signal S2 or a baseband auxiliary video input signal S1B to provide a source of baseband composite video signal S3 which is processed, as will be described, for display by a kinescope 18 (or other suitable display device, such as a CCD display).

To process the signal S3 for display, the receiver 10 includes a luminance/chrominance signal separator 20A (outlined in phantom) having an input 22 for receiving the composite video signal S3 and outputs 24 and 26 for providing, respectively, a separated and noise reduced luminance output signal S14 and a separated and noise reduced chrominance component video output signal S13. The components S14 and S13 are applied to a luminance/chrominance (Y/C) processing and matrix unit 16 which provides conventional functions such as brightness and contrast control, hue and saturation control and the like and generates an RGB component video output signal for the kinescope display unit 18.

The signal separation and noise reduction unit 20A, in this example of the invention, is of digital construction and includes an analog to digital converter 23 clocked by a four-times the subcarrier clock 25 (i.e., 4-fsc sampling) for converting the composite video signal S3 to digital form (S4) with a resolution of, illustratively, eight bits per sample. It will be understood that the invention may well be practiced using analog components and if analog processing is done then the clock 25 and converter 23 may be omitted. Also, in this example of the invention, it is assumed that the Y/C processing and matrix circuit is of the digital type and for this reason no digital to analog converters are needed for the component output signals S13 and S14. Such output converters may be added, of course, if the processing and matrix unit is of the analog type requiring analog input signals.

For NTSC standard video signals, the use of a 4-fsc sampling rate produces a signal having 910 samples per horizontal line and 4 samples per complete (360 degree) color sub-carrier cycle which corresponds to two clock pulses or samples per half cycle (180 degrees) of the color subcarrier. These parameters should be appropriately adjusted in cases where a different sample rate is selected (such as a rate of 3-fsc or three times the color subcarrier frequency) or where the signal S3 is of the PAL transmission format having a different line rate and color subcarrier frequency.

After conversion to digital form, the composite video signal S4 is combined by an adder 34 with a noise reduction signal S5 to thereby form a noise reduced first video signal S6. Next, signal S6 is applied to a multiple delay circuit comprising delay units 38, 42 and 40 which are connected in cascade, in the order named. Unit 38 provides a delay of one horizontal line less one-half cycle of the time period of the color subcarrier. In terms of digital samples, this delay corresponds to 910 samples (full line) minus 2 clock periods (180 degrees) for a net time delay in unit 38 of 908 samples or clock periods. Units 42 and 40 both have time delays of one-half cycle of the color subcarrier which, for this digital embodiment at the given (4-fsc) sample rate corresponds to 2 clock periods each. Since delay units 38, 42 and 40 are connected in cascade, the net time delays are 908 clocks, 910 clocks and 912 clocks. The multiple delays thus provided by units 38, 42 and 40 thus correspond to multiple time periods of (i) one line less one-half color cycle, (ii) one line exactly and (iii) one line plus one half a color cycle. The delayed signals are identified as respective ones of video signals S7, S8 and S9.

Figure 5:
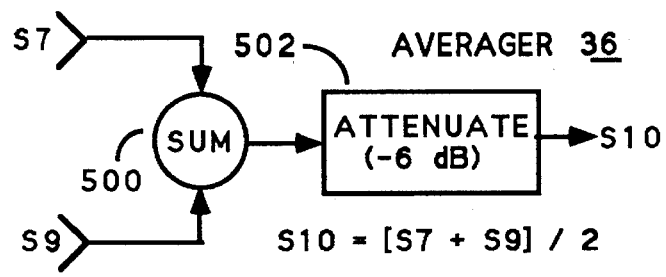
FIGS. 5 and 6 are block diagrams of averaging circuits suitable for use in the examples of FIGS. 1, 2 and 3.
Figure 6:
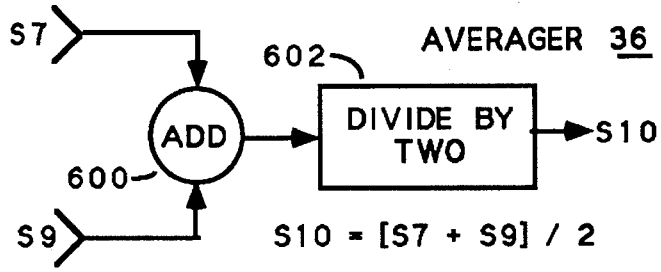

After formation of the multiple delays described above, the shortest S7 and longest S9 are averaged in an averager 36 to provide an averaged signal S10. The averaged value of signal S10 equals the sum of signal S9 plus signal S7 divided by two (e.g., [S7+S9]/2). FIGS. 5 and 6 provide examples of suitable analog and digital signal averagers. In FIG. 5 analog signals S7 and S9 are combined in a summing circuit 500 the output of which is attenuated by 6 decibels in an attenuator 502. FIG. 6 is similar except that the signals are digital and are added in a digital adder 600 and divided by two in a divider 602. As a practical matter, the division by two in binary digital processing requires no "hardware". All that is required is a one bit shift of the binary point which may be accomplished by dropping the LSB (least significant bit) output of the adder.

Figure 8:
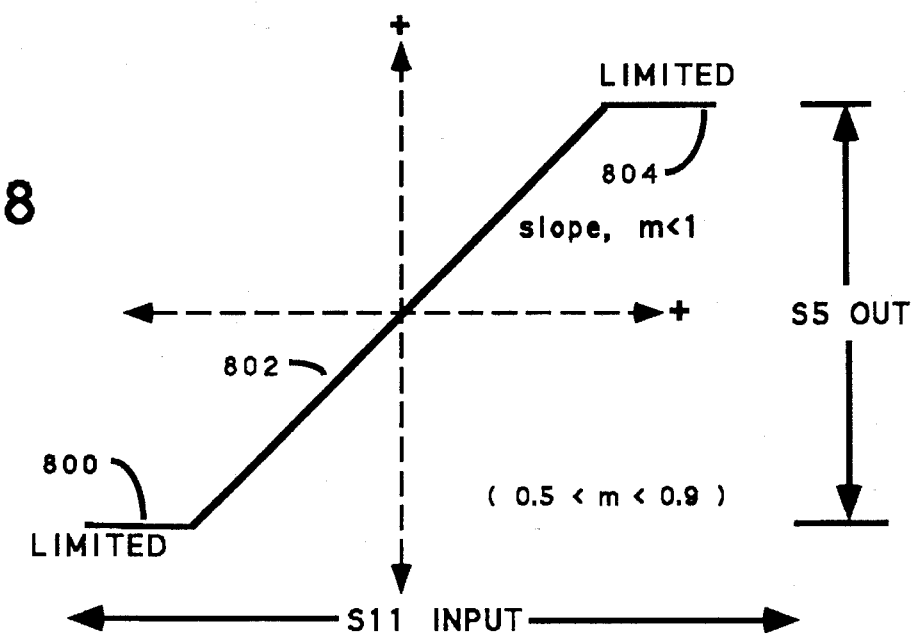
FIGS. 8 and 9 are transfer function diagrams of limiter circuits suitable for use in the examples of FIGS. 1, 2 and 3.
Figure 9:
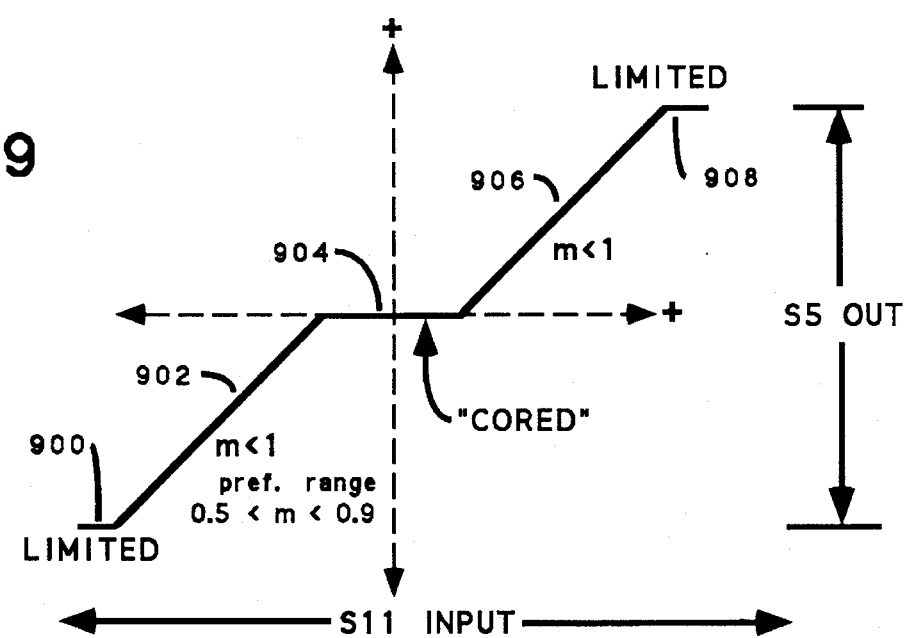

The averaged signal S10 provided by averager 36 is used to form the video noise reduction signal S5 by subtractively combining the composite video input signal S4 with the averaged signal S10 in a subtractor 30 and limiting the resultant difference signal S11 with a limiter 32. FIGS. 8 and 9 are examples of suitable limiter transfer functions.

In FIG. 8 the limiter 32 exhibits a linear transfer function 802 (i.e., a constant gain) between the negative limiting level 800 and the positive limiting level 804 of the output signal S5. The slope "m" of the linear region is selected to be less than unity (m<1) to ensure convergence to zero in the absence of an input signal as will be explained later. A preferred gain range is between 0.5 and 0.9. The higher gain results in averaging more pixels and thus more noise reduction but increased delay or adaptation to changing scene content. The lower gain provides faster response at the expense in fewer pixels being averaged for noise reduction purposes. The preferred range of 0.5<m<0.9 represents a desirable compromise between noise reduction efficiency and responsiveness to scene changes.

FIG. 9 illustrates a preferred limiter transfer function which includes a "dead zone" or "coring" region 904 between the linear regions 902 and 906 of the limiter transfer function. As in the example of FIG. 8, the slopes ("m" values) of the linear segments 902 and 906 of the transfer function are less than or equal to unity and, preferably are in the range of 0.5 to 1.0. Advantageously, the coring region 904 provides further enhancement of noise immunity in addition to the vertical and horizontal noise reduction effects previously discussed of the overall system. Essentially, the "coring" region suppresses small signal perturbations and thus keeps such "fine detail" or noise from recirculating in the recursive filtering loop.

Figure 10A:
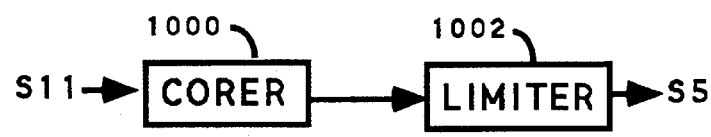
FIGS. 10A and 10B are block diagrams of limiting and coring circuits suitable for providing the transfer function of FIG. 9.

The coring feature may be added to the example of FIG. 1 by either direct implementation in the limiter or by connecting the limiter in cascade with a corer. The latter approach is shown in FIG. 10A where corer 1000 is connected in series with limiter 1002. The option of direct implementation of coring in the limiter may be implemented as is shown in FIG. 10B by using a ROM (read only memory) 1004 for the limiter and storing the transfer function of FIG. 9 in the ROM.

In operation, of the portion of the separator 20A discussed thus far, the output S11 of the subtractor 30 represents the difference between the video input signal S4 and the noise reduced and averaged video signal S10 of the previous line. Accordingly, the coherent signal components of S4 and S10 tend to cancel and the difference between the respective noise components of S4 and S10 appears as S11 at the subtractor output. The phase of this noise difference signal is opposite to that of the input signal noise signal due to the subtraction and so when S11 is ultimately added to S4 in adder 34 there is a reduction of the S6 noise level. The noise reduced signal S6 is delayed by a line and fed back to form S10 and the noise reduction process repeats recursively with additional noise being removed for each new line received. To ensure that the recirculating video signal S10 eventually reduces to zero when the input signal S4 goes to zero, the gain of the limiter 32 is selected to be less than unity as previously discussed.

The main function of limiter 32 is to minimize the effects of the noise reduction system on the vertical detail of the noise reduced signal S6. Recall that subtractor 30 compares a present pixel with one averaged from a line earlier. If there is a horizontal line in the displayed image then pixels on either side of the line will differ greatly in amplitude and the difference signal S11 will be many times as large as the noise difference component it is intended to represent. Limiter 32 prevents large values of the signal S11 from reaching the adder 34. The limiting level is, however, high enough to allow noise to pass through to adder 34 to accomplish noise reduction. Illustratively, for this purpose a limiting level in the range of just a few IRE signal level units is desirable. It has been found in visual tests that limiting levels around 2 or 3 IRE units provide adequate noise reduction with acceptably low visual artifacts.

Figure 10B:

In addition to limiting the noise reduction signal S5 as discussed above, it has been found desirable also to core the noise reduction signal as previously discussed with regard to FIGS. 9, 10A and 10B. The coring advantageously prevents removal of low amplitude vertical detail from displayed images by blocking passage of small values of the difference signal S11. A coring level suitable for this purpose must be less than the value of the limiting level. Illustratively, a coring level of about 1 IRE unit has been found adequate (or 1 or 2 LSBs in a digital system) with limiting in a range of 2 or 3 IRE units.

Averager 36 performs an important part of the recursive noise reduction loop in that it determines the phase of the chrominance component that is re-circulated within the recursive (feedback) loop to enable the noise reduction system to be used with composite video signals. Recall that the object of the present invention is to concurrently separate and noise reduce composite video signals. In composite NTSC video signals, however, there is not an integer relationship of color cycles per line. Accordingly, if the feedback signal S10 were delayed by exactly one line with a conventional 1-H delay, the color phase would be reversed in the feedback signal causing low amplitude chroma to drive the limiter into limiting even when no vertical detail is present.

In view of the foregoing, a correction in color phase of the feedback signal S10 is made by averaging a short line (i.e., a line less a half of one color cycle) with a longer line (i.e., a line plus one half of one color cycle). The resultant signal S10 is delayed on average by one line, which is necessary for good recursive noise reduction, and the averaging has produced a color phase in the feedback signal that matches the color phase of the incoming signal. Consequently, the color component of the signal is noise reduced as well as the luminance signal component.

A further advantage of the averaging of long and short lines to produce the line delayed feedback signal S10, is that a horizontal filter is formed by the two half-cycle delays and the averager 36. The effect is to remove additional high frequency noise. Thus, noise is reduced by filtering in two spatial dimensions, horizontally by the averaging process and vertically by the recursive filtering.

The remaining elements of separator 20A in FIG. 1 comprise two subtractors 50 and 56 and a chroma bandpass filter 52 which form a "combining circuit". This is the output portion of the separator which combines the noise reduced video signal S6 provided by adder 34 with the noise reduced and one-line delayed video signal S8 provided at the output of the half-cycle delay unit 42 to produce the separated luminance and chrominance signal components S14 and S13. Specifically, the line delayed signal S8 is subtracted from signal S6 in subtractor 50 and the resultant difference signal is band pass filtered in the chroma band pass filter 52 to produce the separated chrominance component S13.

Figure 4:
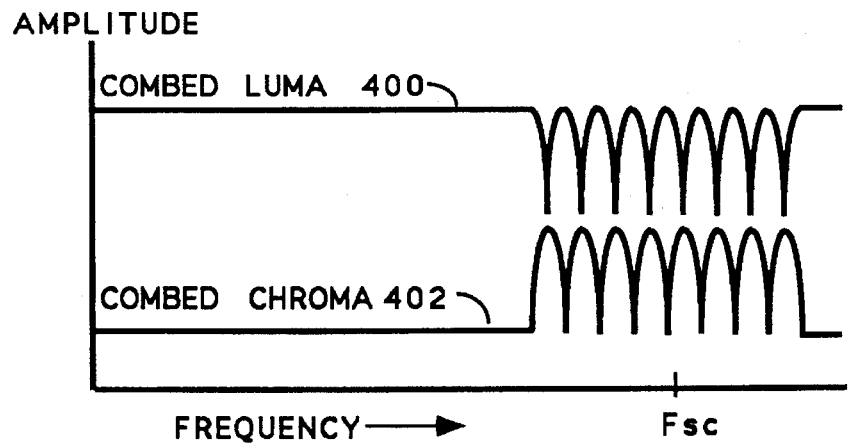
FIG. 4 is a diagram illustrating comb filtering in the receivers of FIGS. 1, 2 and 3.

The line delay 38, the half-cycle delay 42, the subtractor 50 and the chroma band pass filter 52 form a 1-H (one line) chrominance comb filter that produces the separated noise reduced chrominance signal S13 as noted above. The amplitude response or transfer function for this filter is illustrated in FIG. 4 by the amplitude characteristic 402. The width of the pass-band of the chrominance signal is determined by the band pass filter 52. Within the chrominance pass band the recurrent amplitude peaks are produced at frequencies which are odd multiples of one-half the horizontal line rate.

The separated luminance component S14 is produced by subtractor 56 which subtracts the separated chrominance component S13 from the noise reduced un-delayed video signal S6. As shown in FIG. 4 by amplitude response 400, this produces an amplitude response with a gain of unity for all luminance components below the lower band edge of chroma filter 52 and produces a response in the luminance signal that is comb filtered throughout the frequency range of the band pass filter 52. The peaks of the luminance response occur at multiples of the horizontal line rate and coincide with the valleys of the chrominance signal response as illustrated by the response characteristics 400 and 402.

FIG. 2 illustrates a modification of the separator 20A in the example of FIG. 1 in which a different 1-H comb filter topological configuration is used for combining the output signals S6 of adder 34 with the output signal S8 of the half-cycle delay unit 42 to form the separated output signals S13 and S14. As will be explained, the resultant noise reduced combed responses for luma and chroma are the same as shown in FIG. 4 for the FIG. 1 embodiment even though, in the example of FIG. 2, the luma component is combed throughout the entire luminance signal band as an interim step in the processing.

In detail, in separator 20B of FIG. 2 the output signal combining elements 50, 52 and 56 of FIG. 1 are replaced by two adders 200 and 206, one subtractor 202 a low pass filter 204 and a chroma band pass filter 208. The separated chrominance signal is produced the same way as in the example of FIG. 1, namely, subtractor 202 subtracts the line delayed noise reduced signal S8 from the un-delayed noise reduced signal S6 and the resultant signal S12 is bandpass filtered by filter 208 to provide the separated noise reduced chrominance signal S13. The filter response is shown by response 402 in FIG. 4 and is the same as in the previous example.

The difference between the separators 20A and 20B of FIGS. 1 and 2 is in the separation of the luminance signal component. Recall that in separator 20A of FIG. 1, the luminance component was obtained by subtracting the separated chrominance output signal S13 from the un-delayed noise reduced composite video signal S6 producing the comb filter response 400 of FIG. 4. In the separator 20B of FIG. 2, the luminance component is separated by adder 200 which adds the composite video signal S6 to the line delayed composite video signal S8. This forms a line comb filter in which the resultant luminance signal S15 is combed throughout its entire bandwidth. Since the luminance region below the chroma band conveys vertical detail, the combed luminance signal S15 lacks vertical detail. The combed vertical detail, however, is available at the output of subtractor 202 and is separated from the chrominance component by means of a low pass filter 204 which passes signal components below the chrominance band. The resultant vertical detail signal S16 is restored to the luminance signal by means of adder 206 thus replacing the vertical detail lost due to combing at the output of adder 200 and producing the separated luminance video output signal S14. As shown in FIG. 4 by the luma response 400, the luminance component is combed only in the upper region in the chroma band and there is no loss in vertical detail. As previously noted, this is the same overall result achieved in the example of separator 20A but with a different circuit topology.

In the foregoing examples of FIGS. 1 and 2 it was shown that delays 38 and 42 provide 100% of the delay required for signal separation and 99.78% of the delay required for vertical and horizontal noise reduction (i.e., 910 out of 912 clock cycles of delay). Accordingly, by "sharing" these two specific circuit elements, the addition of noise reduction to a 1-H comb (as shown in FIGS. 1 and 2) only requires 2 additional clock delays, out of the 910 that would be otherwise required for one-line comb filter signal separation. Thus, in terms of video signal memory requirements, one may add noise reduction to one-line comb filter separators at the modest memory cost of only requiring about two tenths of one percent (i.e., 0.2%) more memory (delay) than a one-line comb separator without noise reduction.

As previously explained, 2-H comb separators provide more efficient separation with fewer visual artifacts as compared with one-line comb filter separators. In the example of FIG. 3, as will now be discussed, it will be shown that the benefits of noise reduction and two-line comb separation may be achieved with even higher memory efficiency. Specifically, for the 2-H comb separator shown, with sampling at an assumed rate of four times the color subcarrier frequency, 1820 pixels or clock cycles of delay are required for line combing purposes and 6 pixels of delay are used for "cross gradient" processing giving a total of 1826 pixels for the comb separation function without noise reduction. With noise reduction, only two additional pixels of delay (corresponding temporally to one-half of one color cycle) are required over the 1826 needed for 2-H separation.

In the separator 20C of FIG. 3 the noise reduced composite video signal S6 and the line delayed noise reduced composite video signal S8 are combined to form separated component signals S13 and S14 by means of the elements labeled 302 to 318. As a brief overview, these elements form, in effect, an adaptive comb filter that combines a given pixel with a "blend" or mixture of pixels a line earlier and a line later. The blending or "mixing" of the pixels, in turn, is controlled by a switch control unit 308 which analyzes diagonals of an array of pixels (see FIG. 11) to produce a chrominance signal S21 having reduced visual artifacts. The luminance signal, S14, is separated by subtracting the recovered chrominance signal S21 from the line delayed noise reduced composite video signal S8. Control of the blending is by line to line diagonal gradient measurements or "cross gradients" as described in U.S. Pat. No. 4,786,963 of McNeely and Willis. For completeness, FIG. 12 herein provides details of the NcNeely et al. switch or "blending" control signal generator.

In FIG. 3, the noise reduced composite video signal S6 provided by adder 34 and the one-line delayed noise reduced composite video signal are applied to respective band-pass filters 306 and 302 having bandwidths inclusive of the chrominance signal band (illustratively, 1.0–4.2 MHz). Filter 306 thus produces a band limited signal Bb corresponding to the bottom line of pixels g, h and i of FIG. 11. Filter 302 produces pixels corresponding to d, e and f which occur a line earlier than line N and thus form the middle line or Mb signal. To provide the pixels a, b and c for line N-2 (the top line of FIG. 11), signal Mb of filter 302 is delayed by one full line in a line delay unit 304.

The separated chrominance signal is formed by means of a subtractor 312 which subtracts either the top line signal Tb or the bottom line signal Bb or a blend of the two from the middle line video signal Mb thus forming an adaptive comb filter. The adaptation of this filter is controlled by switch control unit 308 which receives signals Tb, Mb and Bb, analyzes the diagonal differences thereof and generates a control signal K for controlling the blending switch 310. Briefly stated, control unit 308 analyzes pixels "a–i" to find the best combination of lines N and N-2 for combining with line N-1 so as to reduce visual artifacts such as hanging dots. In the McNeely et al. apparatus, this analysis is based on diagonal measurements of the nine pixels a–i shown in FIG. 11 by means of a processor shown in FIG. 12 herein and discussed later. The picture analysis provided by unit 308 is described by the following three relationships:

$$XU = MAX\{ABS(a-f), ABS(c-d)\} \qquad (1)$$

$$XL = MAX\{ABS(d-i), ABS(f-g)\} \quad (2)$$

$$K = XL/[XL+XU] \quad (3)$$

Figure 11:
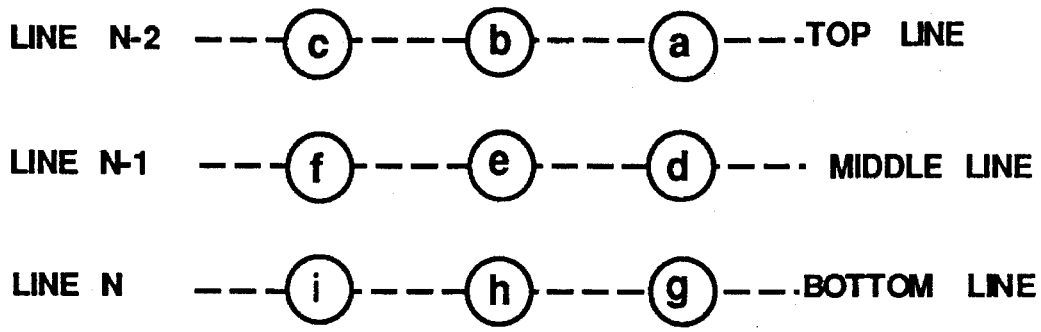
FIG. 11 is a spatial diagram illustrating line and pixel relationships in operation of the example of FIG. 3 when cross gradient processing is used for controlling blending.

In expression (1) above, XU is defined as an "upper cross gradient" and, with reference to FIG. 11, lines N-2 and N-1, this gradient equals the maximum (MAX) of two functions, namely, the absolute value of the pixel difference a–f and the absolute value of the pixel difference c–d. This function, in other words, assigns a value to the largest of the two diagonal gradients a–f and c–d occurring between the top and middle lines, N-2 and N-1.

In the expression (2) above, XL is defined as a "lower cross gradient" and, with reference to FIG. 11 lines N-1 and N, this gradient equals the maximum (MAX) value of two functions, namely, the absolute value of the pixel difference d–i and the absolute value of the pixel difference f–g. This function, in other words, assigns a value to the largest of the diagonal gradients d–i and f–g occurring between the middle line N-1 and the bottom line N.

The blending decision is made in accordance with equation 3 which provides that K, the control signal, is set equal to the value of the lower cross gradient divided by the sum of the two cross gradients. If, for example, XL is zero (indicating no difference between the middle and bottom lines) and XU is other than zero, then K will equal zero and cause switch 310 to select the bottom line signal Bb for subtraction from the middle line signal in subtractor 312 thus producing the combed chroma signal S21 (after scaling by 6 dB provided by divider 314.

Conversely, if the lower gradient XL is not zero and the upper gradient is zero, the K will equal unity or "1". This indicates that the top and middle lines would provide a better choice for combing than the middle and bottom lines and so switch 310 will select the top line signal Tb for application to subtractor 312.

A third condition occurs where neither XL or XU is zero. For this case the switch control unit 308 causes switch 310 to blend the top and bottom lines in accordance with equation (3) above and in so doing favors the signal having the least line to line difference and thus providing minimal visual artifacts.

Recovery of the luminance component in the example of FIG. 3 is accomplished by subtractor 316 which subtracts the separated adaptively comb filtered chrominance component from the middle line full bandwidth noise reduced signal S8 provided by half-cycle delay unit 42. Since the chrominance signal S21 is band limited to the 1.0 to 4.2 MHz region by filters 302 and 306, the vertical detail component of the luminance signal is not degraded since the signal S14 is not combed below 1.0 MHz. Accordingly, no vertical detail restoration is needed. Since the bandwidth of signal S21 is somewhat wider than normal, a further bandpass filter 318 is provided for limiting the chrominance signal bandwidth to about 3.58 MHz plus or minus about a half MHz.

It will be appreciated that the development of the control signal "K" in the example of FIG. 3 necessarily introduces a processing delay. In application of the principles of the invention it is desirable that this processing delay be compensated for by introducing similar delays in the signal paths leading to the "soft switch" 310 and the subtractor 312. Since correction for the processing delay in the chrominance signal path delays the chrominance signal S13 which is used, in this example, for developing the luminance signal S14, one may add additional compensating delay in the luminance signal path leading to subtractor 316 to thereby ensure proper luma/chroma registration.

Figure 12:
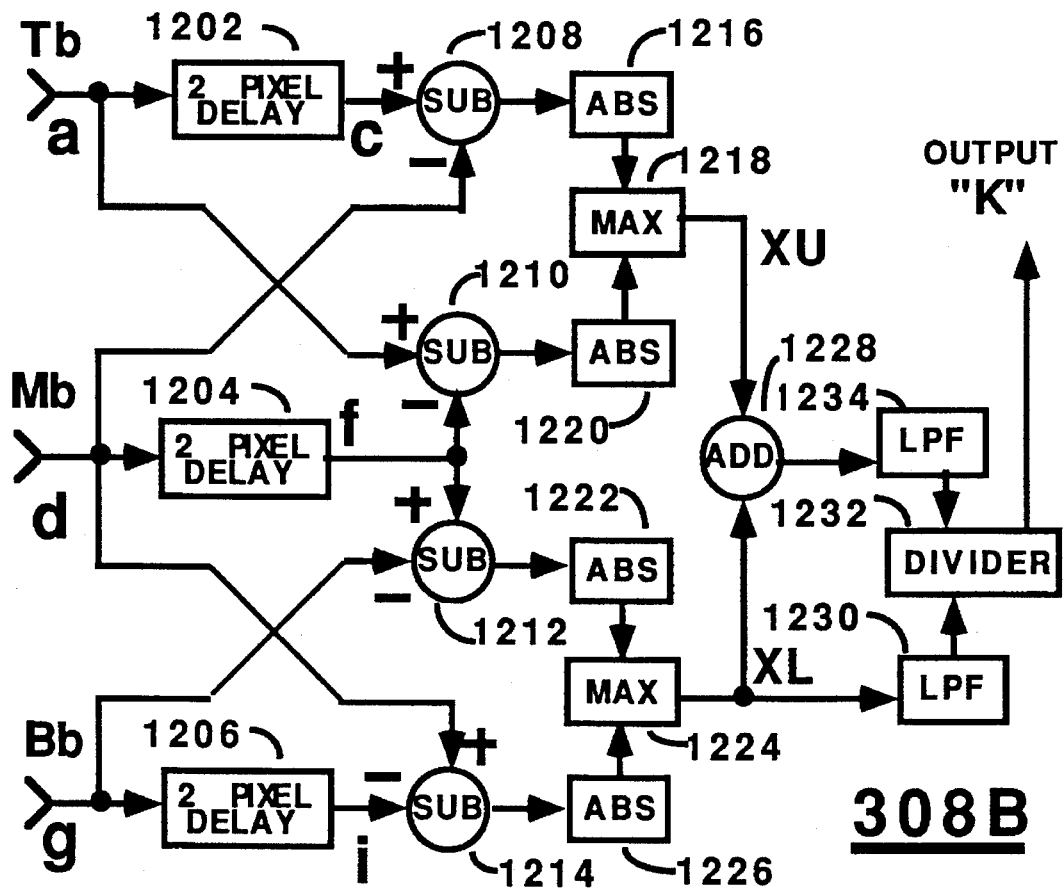
FIG. 12 is a block diagram of a cross gradient processor suitable for use in the example of FIG. 3.

As previously noted, FIG. 12 provides a presently preferred implementation of switch control unit 308 which implements equations 1, 2 and 3. The pixels c, f and i are formed by delaying signals Tb, Mb and Bb in two-pixel delay units 1202, 1204 and 1206, respectively. The diagonal differences c–d, a–f, f–g and d–i are provided by subtractors 1208, 1210, 1212 and 1214, respectively, which subtract d from c, f from a, g from f and i from g, respectively. The absolute values of the subtractor outputs are formed by absolute value circuits 1216, 1220, 1222 and 1226, respectively. Signal XU is provided by the maximum value detector 1218 which passes the maximum of the outputs of the absolute values circuits 1216 and 1220. Signal XL is provided by the maximum value detector 1224 which passes the maximum of the outputs of absolute value circuits 1222 and 1226. Equation (3) is implemented by adder 1228 which adds the maximum values and divider 1232 which divides the output of maximum value circuit 1224 by the output of adder 1228 to form the control signal "K". The low pass filters 1230 and 1234 eliminate high frequency variations. Operation of the cross gradient processor 308B in the system of FIG. 3 is as previously described in detail in the discussion of switch control unit 308 and expressions 1–3.

Figure 7:
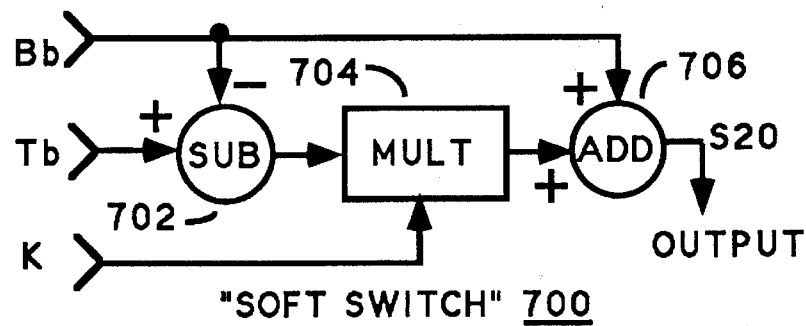
FIG. 7 is a block diagram of a "soft" or "blending" switch suitable for use in the example of FIG. 3.

FIG. 7 provides a suitable implementation of the soft switch 310 which includes a subtractor which subtracts the bottom line signal Bb from the top line signal Tb. A multiplier 704 multiplies the subtractor 702 output by the control signal K and the result is added to signal Bb to form the blended output signal S20. In operation, when K is zero the bottom line signal Bb is passed to subtractor 312 for combing to form the chrominance component output signal. When K is unity the signal Bb is inverted by subtractor 702 and thus cancelled in adder 706 leaving the top line signal Tb for combing in subtractor with the middle line signal to form the chrominance component output signal S21. For K values between zero and unity the top and bottom line signals are blended in proportion to the value of "K" so that S20 equals K times Tb plus the quantity (1–K) times signal Bb.

Figure 13:
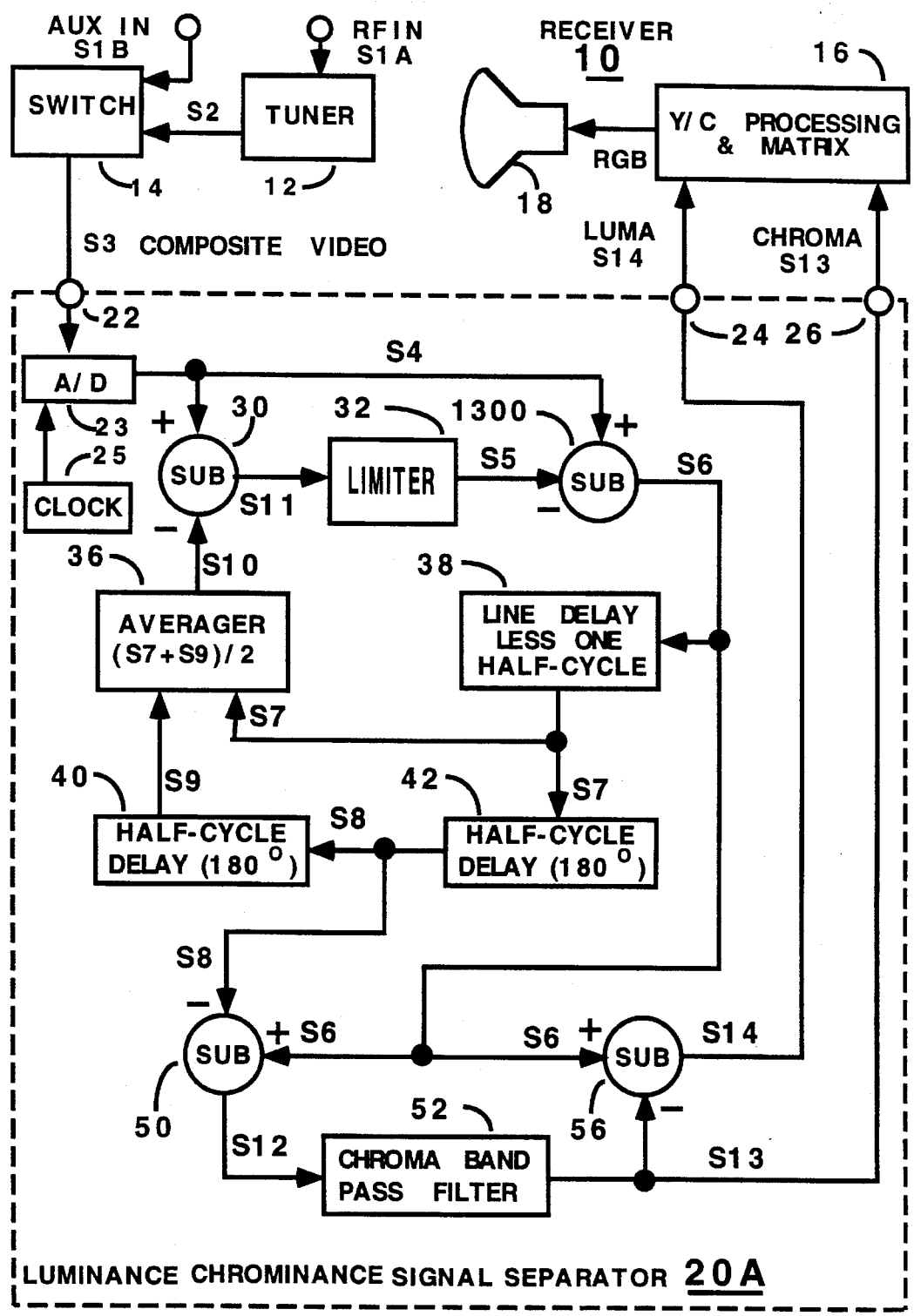
FIG. 13 is a block diagram illustrating a modification of the apparatus of FIG. 1.

FIG. 13 illustrates a modification of the separator of FIG. 1 which provides an alternative for obtaining the difference signal S11 from the composite video input signal S4 and the averaged feedback signal S10. Recall that in the example of FIG. 1 that signal S11 was obtained by subtractor 30 which subtracts the composite video input signal S4 from the averaged signal S10. In the modified circuit of FIG. 13 the input terminals of subtractor 30 are reversed. Accordingly, in this example the difference signal S11 is obtained by subtracting the averaged signal S10 from the composite video signal S4.

Since the foregoing change will effectively invert signal S11 and the limited signal S5, a second inversion is provided to ensure that the phase of the noise reduction signal relative to the composite video input signal is of proper polarity to provide noise reduction when the noise reduction signal is combined with the composite video input signal S4 to produce the noise reduced video signal S6. This function is provided in the example of FIG. 13 by replacing adder 34 of FIG. 1 with a subtractor 1300. The subtractor is connected so as to subtract the limited difference signal S5 from the composite video input signal. Advantageously, these modifications provide useful topological alternatives to the design engineer for forming the noise reduction signal without altering the overall operation of the modified circuit.

As used throughout the foregoing description the term "color cycle" has been used to represent a period of time equal to one complete cycle of the chrominance signal subcarrier. This time period corresponds to two Pi radians of angle or three hundred sixty electrical degrees of rotation. Accordingly, the term "one-half color cycle" corresponds to the length of time for the color subcarrier to pass through Pi radians of revolution or one hundred eighty electrical degrees. For digital systems sampled at a rate of four times the color subcarrier, one color cycle corresponds to a time period of four picture elements ("pixels") and one-half color cycle corresponds to a time interval of two pixels. Sampling at the rate of four-times the color subcarrier in digital systems is preferred because of the relative ease that delays of a half color cycle may be achieved (2 pixels=0.5 color cycles). However, digital implementations of the invention may be realized with other sampling rates by use of interpolation to obtain half-cycle delays.

What is claimed is:

1. A method for noise reducing and separating components of a composite video input signal, comprising the steps of:

combining said composite video input signal with a noise reduction signal to form a noise reduced first video signal;

delaying said noise reduced first video signal to form a plurality of delayed video signals having respectively different delays;

forming said noise reduction signal by combining said composite video input signal with a selected pair of said delayed video signals; and combining said noise reduced first video signal with a further one of said delayed video signals to form separated and noise reduced chrominance and luminance component output signals.

2. A method as recited in claim 1 wherein:

said plurality of delayed video signals comprises a first delayed video signal having a delay of one line minus one-half color cycle, a second delayed video signal having a delay of one line, and a third delayed video signal having a delay of one line plus one-half color cycle;

said selected pair of said delayed video signals comprises said first and third delayed video signals; and said further one of said delayed video signals comprises said second delayed video signal.

3. A method as recited in claim 2 wherein the step of forming said noise reduction signal comprises:

averaging said first and third delayed video signals to form a resultant averaged signal and forming a difference signal between the resultant averaged signal and the composite video input signal.

4. A method as recited in claim 1 wherein the step of combining said composite video input signal comprises a selected one of:

(i) adding said composite video input signal to said noise reduction signal and (ii) subtracting said noise reduction signal from said composite video input signal.

5. A method as recited in claim 2 wherein the step of forming said noise reduction signal comprises:

averaging said first and third delayed signals to provide an averaged signal; and forming a difference signal between the averaged signal and the composite video input signal; and limiting said difference signal.

6. A method as recited in claim 3 further comprising:

applying coring to said noise reduction signal prior to the combining thereof with said composite video input signal.

7. A method as recited in claim 3 wherein the step of combining said noise reduced first video signal with a further one of said delayed video signals comprises:

combining said first video signal with said second delayed video signal for producing said separated and noise reduced chrominance component output signal; and subtracting said separated and noise reduced chrominance component output signal from said first video signal for producing said separated and noise reduced luminance component output signal.

8. A method as recited in claim 2 wherein the step of combining said noise reduced first video signal with a further one of said delayed video signals comprises:

delaying said second delayed video signal by one line to form a fourth delayed video signal;

combining said first video signal, said second delayed video signal and said fourth delayed video signal as a function of image detail for forming said separated and noise reduced chrominance component output signal; and subtractively combining said separated and noise reduced chrominance component output signal with said second delayed signal for forming said separated and noise reduced luminance component output signal.

9. A method as recited in claim 2 wherein the step of combining said noise reduced first video signal with a further one of said delayed video signals comprises:

combining said noise reduced first video signal with said second delayed video signal for producing said separated and noise reduced chrominance component output signal and a vertical detail video signal; and combining said first video signal with said second delayed video signal for producing a luminance component signal having diminished vertical detail; and combining said luminance component signal with said vertical detail video signal for forming said separated and noise reduced luminance component output signal.

10. A method as recited in claim 2 wherein said plurality of delayed video signals are formed by the steps of:

forming said third delayed video signal by delaying said second delayed video signal by the one-half color cycle;

forming said second delayed video signal by delaying said first delayed video signal by the one-half color cycle; and forming said first delayed video signal by delaying said noise reduced first video signal by the one line minus one-half color cycle.

11. Apparatus for noise reducing and separating luminance and chrominance components of a composite video input signal, comprising:

a source for providing said composite video input signal;

first circuit means, coupled to said source, for combining said composite video input signal with a noise reduction signal supplied thereto to form a noise reduced first video signal;

second circuit means, coupled to said first circuit means, for delaying said noise reduced first video signal to form a plurality of delayed video signals having respectively different delays;

third circuit means, coupled to said source and to said second circuit means, for combining said composite video input signal with a selected pair of said delayed video signals to form said noise reduction signal; and fourth circuit means, coupled to said first and second circuit means, for combining said noise reduced first video signal with a further one of said delayed video signals to form separated and noise reduced chrominance and luminance output signals.

12. Apparatus as recited in claim 11 wherein:

said plurality of delayed video signals comprises (i) a first delayed video signal having a delay of one line minus one-half color cycle, (ii) a second delayed video signal having a delay of one line, and (iii) a third delayed video signal having a delay of one line plus one-half color cycle;

said selected pair of said delayed video signals comprises said first and third delayed video signals; and said further one of said delayed video signals comprises said second delayed video signal.

13. Apparatus as recited in claim 12 wherein said third circuit means comprises:

an averager, coupled to said second circuit means for averaging said first and third delayed video signals to provide a resultant averaged signal and a subtractor, coupled to said source and to said averager, for forming a difference signal between the resultant averaged signal and the composite video input signal.

14. Apparatus as recited in claim 12 wherein said first circuit means comprises a selected one of:

(i) an adder for adding said composite video input signal to said noise reduction signal and (ii) a subtractor for subtracting said noise reduction signal from said composite video input signal.

15. Apparatus as recited in claim 12 wherein said third circuit means for forming said noise reduction signal comprises:

an averager for averaging said first and third delayed video signals to provide an averaged signal;

a subtractor for forming a difference signal between the averaged signal and the composite video input signal; and a limiter for limiting said difference signal.

16. Apparatus as recited in claim 12 further comprising:

circuit means for applying coring to said noise reduction signal prior to the combining thereof with said composite video input signal.

17. Apparatus as recited in claim 12 wherein said fourth circuit means comprises:

a first subtractor, coupled to said first and second circuit means, for combining said first video signal with said second delayed video signal for producing said separated and noise reduced chrominance component output signal; and a second subtractor, coupled to said first subtractor and to said first circuit means, for subtracting said separated and noise reduced chrominance component output signal provided by said first subtractor from said first video signal provided by said first circuit means for producing said separated and noise reduced luminance component output signal.

18. Apparatus as recited in claim 12 wherein said fourth circuit means comprises:

a delay circuit for delaying said second delayed video signal by one line to form a fourth delayed video signal;

a combining circuit for combining said first video signal, said second delayed video signal and said fourth delayed video signal as a function of image detail for forming said separated and noise reduced chrominance component output signal; and a subtractor for subtractively combining said separated and noise reduced chrominance component output signal with said second delayed video signal for forming said separated and noise reduced luminance component output signal.

19. Apparatus as recited in claim 12 wherein said fourth circuit means comprises:

a subtractor for combining said first video signal with said second delayed video signal for producing said separated and noise reduced chrominance component output signal and a vertical detail video signal;

a first adder for combining said first video signal with said second delayed video signal for producing a luminance component signal having diminished vertical detail; and a second adder for combining said luminance component signal provided by said first adder with said vertical detail video signal for forming said separated and noise reduced luminance component output signal.

20. A method as recited in claim 12 wherein said second circuit means comprises:

a first delay unit coupled to receive said second delayed video signal for forming said third delayed video signal by delaying said second delayed video signal by the one-half color cycle;

a second delay unit coupled to receive said first delayed video signal for forming said second delayed video signal by delaying said first delayed video signal by the one-half color cycle; and a third delay unit coupled to receive said noise reduced video signal for forming said first delayed video signal by delaying said noise reduced first video signal by the one line minus one-half color cycle.

* * * * *